United States Patent
Neje et al.

(10) Patent No.: US 8,525,376 B2
(45) Date of Patent: Sep. 3, 2013

(54) DYNAMOELECTRIC MACHINE COIL SPACEBLOCK HAVING FLOW DEFLECTING STRUCTURE IN COIL FACING SURFACE THEREOF

(75) Inventors: Shriniwas Ananda Neje, Bangalore (IN); Rebinth Jose Robin, Bangalore (IN); Samir Armando Salamah, Niskayuna, NY (US); Vidyapati Tiwari, Bhilai Nagar (IN)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 12/896,418

(22) Filed: Oct. 1, 2010

(65) Prior Publication Data

US 2012/0080967 A1    Apr. 5, 2012

(51) Int. Cl.
    *H02K 9/00*    (2006.01)
(52) U.S. Cl.
    USPC ............................................ 310/65; 310/270
(58) Field of Classification Search
    USPC .................. 310/52, 58, 59, 61, 64, 260, 270, 310/65
    See application file for complete search history.

(56) References Cited

U.S. PATENT DOCUMENTS

| | | | |
|---|---|---|---|
| 3,588,557 A | 6/1971 | Kigore et al. | |
| 4,182,966 A | 1/1980 | Mishra et al. | |
| 4,656,382 A | 4/1987 | Moore et al. | |
| 5,252,880 A | 10/1993 | Kazmierczak et al. | |
| 5,483,112 A | 1/1996 | Biseli et al. | |
| 5,644,179 A | 7/1997 | Staub et al. | |
| 6,122,917 A | 9/2000 | Senior | |
| 6,204,580 B1 | 3/2001 | Kazmierczak | |
| 6,252,318 B1 | 6/2001 | Kazmierczak | |
| 6,346,754 B1 | 2/2002 | Kieda et al. | |
| 6,392,326 B1 | 5/2002 | Turnbull et al. | |
| 6,417,586 B1 * | 7/2002 | Jarczynski et al. | 310/61 |
| 6,452,294 B1 | 9/2002 | Vandervort et al. | |
| 6,465,917 B2 * | 10/2002 | Wetzel et al. | 310/61 |
| 6,495,943 B2 | 12/2002 | Wetzel et al. | |
| 6,628,020 B1 | 9/2003 | Tong | |
| 6,720,687 B2 | 4/2004 | Salamah et al. | |
| 6,759,770 B1 | 7/2004 | Wang et al. | |
| 6,870,299 B1 | 3/2005 | Moeleker et al. | |
| 8,115,352 B2 * | 2/2012 | Neje et al. | 310/54 |
| 2007/0222333 A1 | 9/2007 | Hattori et al. | |

FOREIGN PATENT DOCUMENTS

| | | |
|---|---|---|
| JP | 57153542 | 9/1982 |
| JP | 2003189543 | 7/2003 |

OTHER PUBLICATIONS

Thomas Truong, PTO Office Action, U.S. Appl. No. 12/405,459, Notification Date Feb. 7, 2011, 20 pages.
U.S. Appl. No. 12/405,459, Office Action dated Jun. 2, 2011.
U.S. Appl. No. 12/405,459, Notice of Allowance dated Nov. 25, 2011.

(Continued)

*Primary Examiner* — Dang Le
(74) *Attorney, Agent, or Firm* — Hoffman Warnick LLC (57) ABSTRACT

A dynamoelectric machine includes a rotor having a plurality of adjacent coils; a spaceblock disposed between adjacent coils to define at least one cavity adjacent the spaceblock and between mutually adjacent coils; and the spaceblock including a body having one of: a substantially T-shaped cross-section, a substantially hexagonal cross-section and a substantially truncated arrow cross-section, the cross-section providing at least one flow deflector structure on at least one cavity facing surface of the spaceblock for intercepting and redirecting circulating coolant flow in the cavity towards a central region of the at least one cavity.

13 Claims, 9 Drawing Sheets

(56) References Cited

OTHER PUBLICATIONS

U.S. Appl. No. 13/343,482, Office Action dated Mar. 16, 2012.
U.S. Appl. No. 12/431,054, filed Apr. 28, 2009, Decision on Petition dated Sep. 28, 2010.
U.S. Appl. No. 12/431,054, filed Apr. 28, 2009, Notice of Abandonment dated Sep. 28, 2010.
U.S. Appl. No. 12/431,054, filed Apr. 28, 2009, Interview Summary dated Sep. 27, 2010.
U.S. Appl. No. 12/431,054, filed Apr. 28, 2009, Petition to Express Abandon to Avoid Publication filed Sep. 20, 2010.
U.S. Appl. No. 12/431,054, filed Apr. 28, 2009, Office Action dated Sep. 17, 2010.
U.S. Appl. No. 13/343,482, Office Action Dec. 24, 2012, 25 pgs.
U.S. Appl. No. 13/343,482, Office Action dated Aug. 7, 2012.
U.S. Appl. No. 13/343,482, Final Office Action dated Apr. 22, 2013.

* cited by examiner

DYNAMOELECTRIC MACHINE COIL SPACEBLOCK HAVING FLOW DEFLECTING STRUCTURE IN COIL FACING SURFACE THEREOF

BACKGROUND OF THE INVENTION

The present invention relates to a structure for enhanced cooling of a dynamoelectric machine rotor by intercepting and redirecting a circulating coolant flow in a cavity.

In large dynamoelectric machines, such as a turbo-generator, the rotor consists of machined slots along its length in which copper coils are placed. The portions of these coils which extend outside the rotor body are called endwindings. In the endwinding region of a rotor, coils are held tightly by spaceblocks, which are further classified as space, spacer and wedge blocks, depending on their location.

The power output rating of dynamoelectric machines is often limited by the ability to provide additional current through the rotor field winding because of temperature limitations imposed on the electrical conductor insulation. Therefore, effective cooling of the rotor winding contributes directly to the output capability of the machine. This is especially true of the rotor endwindings, where direct, forced cooling is difficult and expensive due to the typical construction of these machines. As prevailing market trends require higher efficiency and higher reliability in lower cost, higher-power density generators, cooling the rotor endwindings becomes a limiting factor. In order to cool the endwindings and coils, a circulating coolant flow is passed through the cavities between spaceblocks and coils, and enters the grooves in coils, which start from these cavities and discharge into a chimney.

Figure 4:
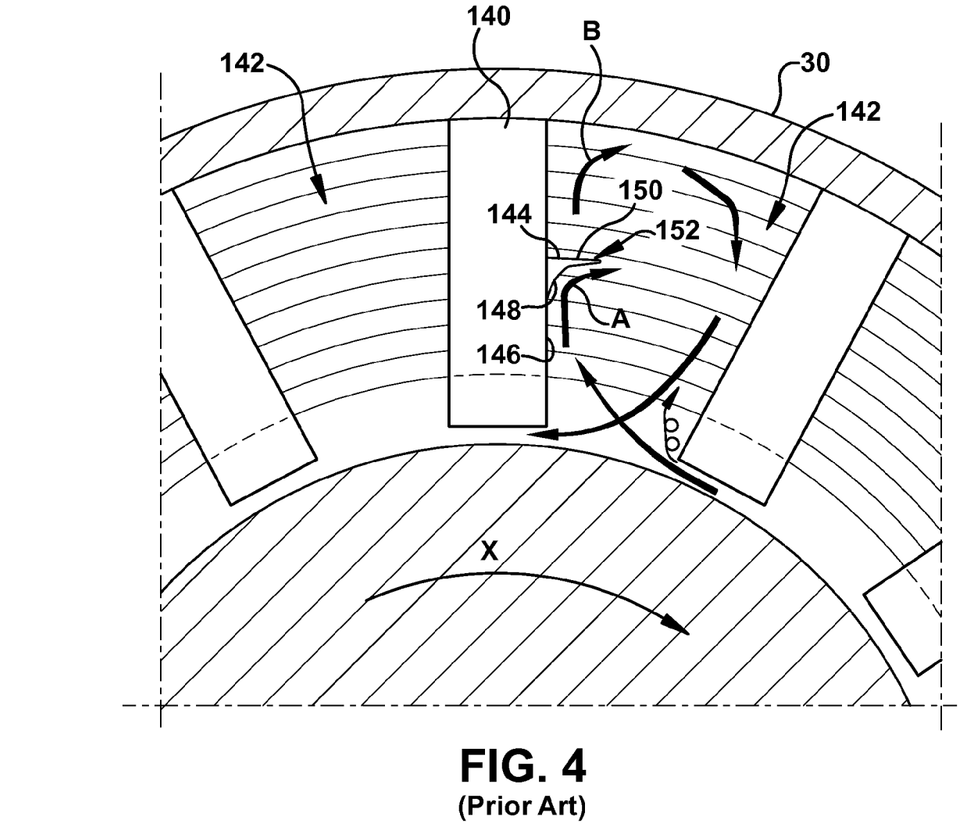
FIG. 4 is a cross-sectional view illustrating a prior art deflector provided on the downstream side of a spaceblock to deflect coolant towards the normally starved center of the cavity.
Figure 5:
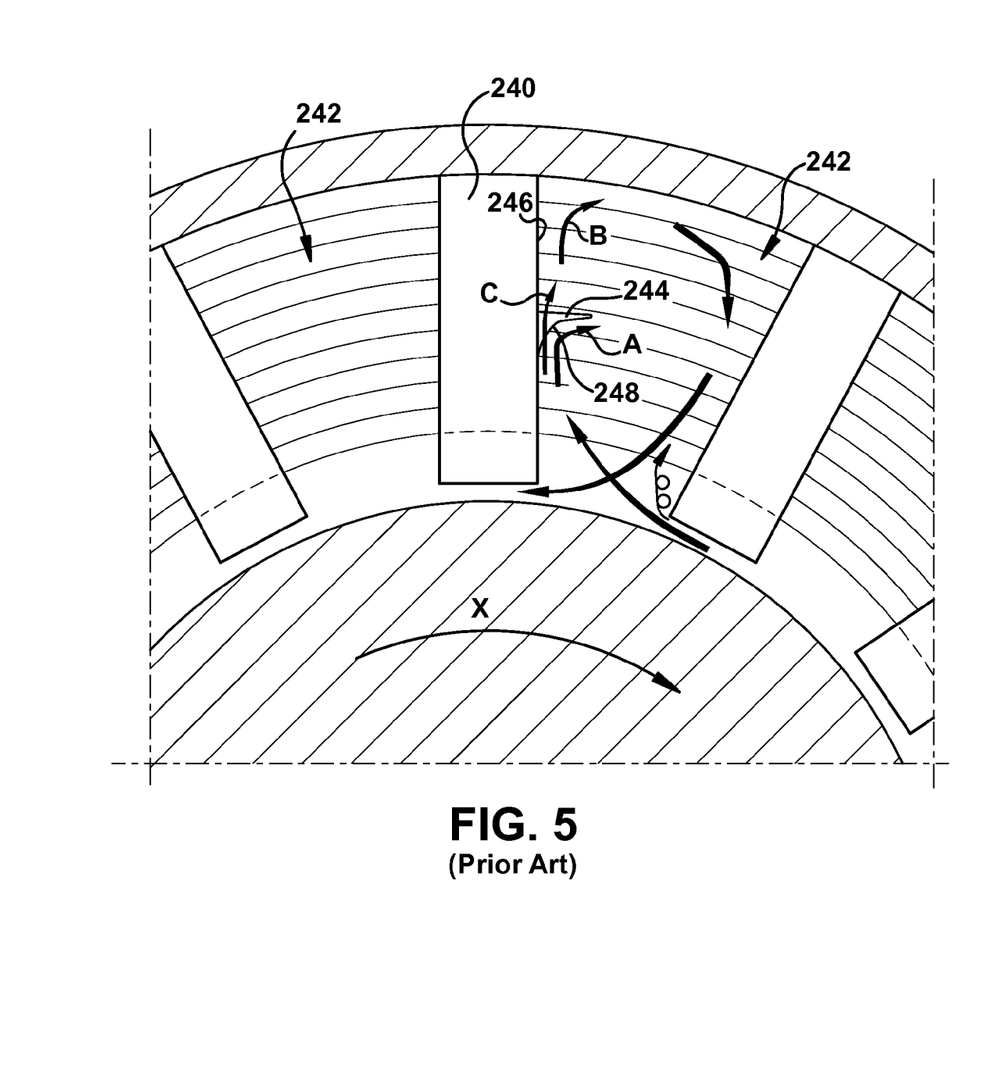
FIG. 5 illustrates an alternate embodiment of at least one prior art deflector provided to each only partially span the depth of the cavity to allow some of the coolant to easily pass to the outer radial extent of the cavity while deflecting a portion of the coolant towards the cavity center.

U.S. Pat. No. 6,465,917 describes a method for augmenting heat transfer by providing a spaceblock having at least one flow deflector structure provided on a cavity facing surface for intercepting and redirecting circulating coolant flow towards a central region of the respective cavity deflector structure increasing the flow velocity of the large single flow circulation cell by introducing additional cooling flow directly into, and in the same direction as, the naturally occurring flow cell. This approach is shown in FIGS. 4 and 5 of the present application. While this method increases the heat transfer in the cavity by augmenting the strength of the circulation cell, the center region of the cavity may still be left with low velocity and therefore low heat transfer.

BRIEF DESCRIPTION OF THE INVENTION

A first aspect of the disclosure provides a dynamoelectric machine, comprising: a rotor having a plurality of adjacent coils; a spaceblock disposed between adjacent coils to define at least one cavity adjacent the spaceblock and between mutually adjacent coils; and the spaceblock including a flow deflector structure on a cavity facing surface of the spaceblock for intercepting and redirecting circulating coolant flow in the cavity towards a central region of the at least one cavity.

A second aspect of the disclosure provides a spaceblock for a gas-cooled dynamoelectric machine, the spaceblock comprising: a body having one of: a substantially T-shaped cross-section, a substantially hexagonal cross-section and a substantially truncated arrow cross-section, the cross-section providing at least one flow deflector structure on at least one cavity facing surface of the spaceblock for intercepting and redirecting circulating coolant flow in the cavity towards a central region of the at least one cavity.

A third aspect is directed to a dynamoelectric machine, comprising: a rotor having a plurality of adjacent coils; a spaceblock disposed between adjacent coils to define at least one cavity adjacent the spaceblock and between mutually adjacent coils; and the spaceblock including a body having one of: a substantially T-shaped cross-section, a substantially hexagonal cross-section and a substantially truncated arrow cross-section, the cross-section providing at least one flow deflector structure on at least one cavity facing surface of the spaceblock for intercepting and redirecting circulating coolant flow in the cavity towards a central region of the at least one cavity.

DETAILED DESCRIPTION OF THE INVENTION

Figure 1:
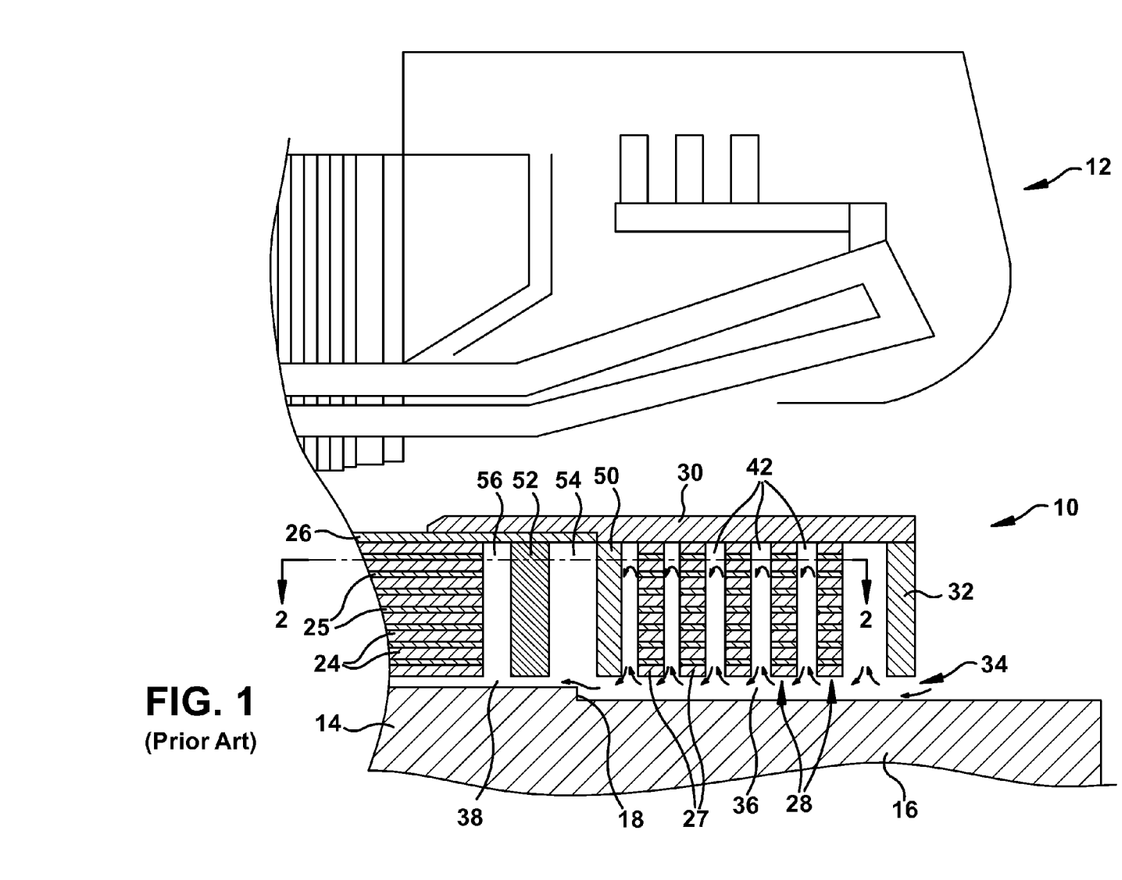
FIG. 1 is a cross-sectional view of a portion of the endwindings of a dynamoelectric machine rotor with stator in opposed facing relation thereto.
Figure 2:
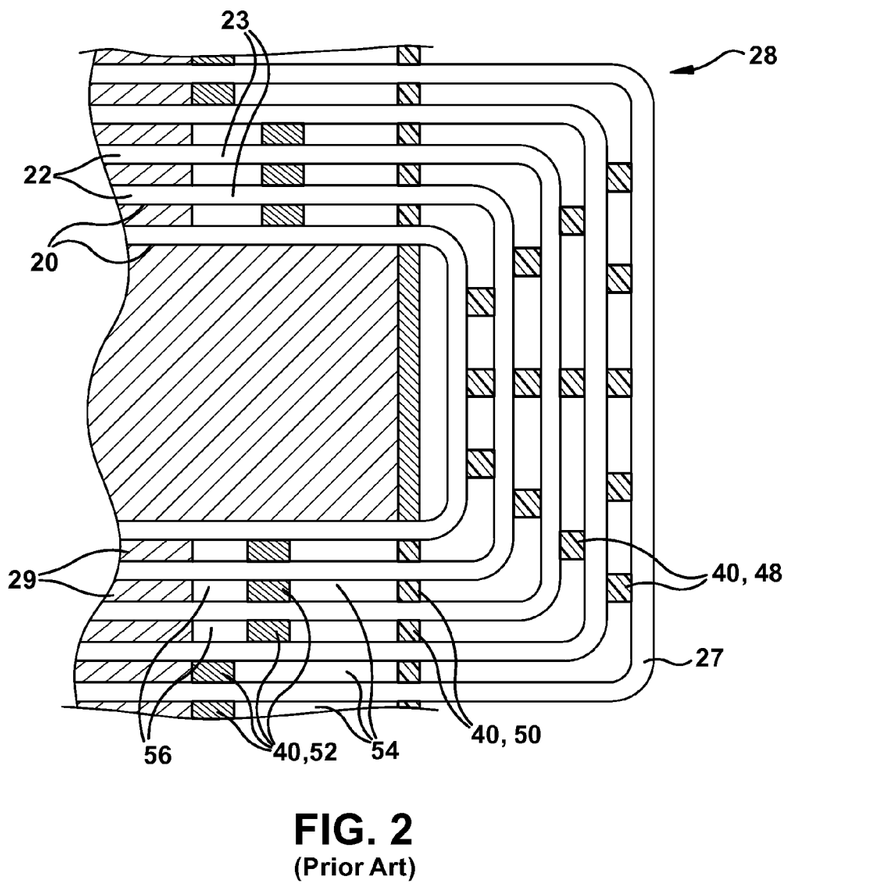
FIG. 2 is a cross-sectional top view of the dynamoelectric machine rotor taken along line 2-2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars 24 are separated by layers of electrical insulation 25. The stacked conductor bars are typically maintained in the slots by wedges 26 (FIG. 1) and are made of a conductive material such as copper. Conductor bars 24 are interconnected at each opposing end of the body portion by end turns 27 of the coils, in an area which may be referred to as the end strap region. Coils 22 include a coil side section including axially extending coils 23 and extend axially beyond the end faces to the end strap region. Collectively, axially extending coils 23 and end turns 27 are referred to as endwindings 28. The end turns 27 are also separated by layers of electrical insulation.

Referring specifically to FIG. 1, a retaining ring 30 is disposed around the end turns at each end of the body portion to hold endwindings 28 in place against centrifugal forces. Retaining ring 30 is fixed at one end to the body portion and extends out over rotor spindle 16. A centering ring 32 is attached to the distal end of retaining ring 30. It should be noted that retaining ring 30 and centering ring 32 can be mounted in other ways, as is known in the art. The inner peripheral edge of centering ring 32 is radially spaced from rotor spindle 16 so as to form a gas inlet passage 34, and endwindings 28 are spaced from rotor spindle 16 so as to define an annular region 36. A number of axial cooling channels formed along slots 20 (FIG. 2) are provided in fluid communication with the gas inlet passage 34 via the annular region 36 to deliver cooling gas to the coils 22 (FIG. 2).

Turning to FIG. 2, end turns 27 at each end of rotor 10 (FIG. 1) may be circumferentially and axially separated by a number of spacers or spaceblocks 40. (For clarity of illustration, the spaceblocks are not shown in FIG. 1). Where spaceblocks 40 are disposed between end turns 27, they may be referred to as an end strap block 48. Furthermore, axially extending coils 23 may be circumferentially separated by a number of spaceblocks 40. In this location, spaceblocks 40 may be referred to as coil side blocks 50 or body wedge blocks 52. The term "wedge" may be applied to these blocks because they may be provided with a wedge shape to accommodate the arcuate shape required to mate with coils 23 in this location. In any event, spaceblocks 40 are elongated block members of an insulating material located in the spaces between adjacent coils whether at the axially extending coil side section or end strap region. Spaceblocks 40 may extend beyond the full radial depth of the endstrap section or the coil side section into annular gap 36.

Figure 3:
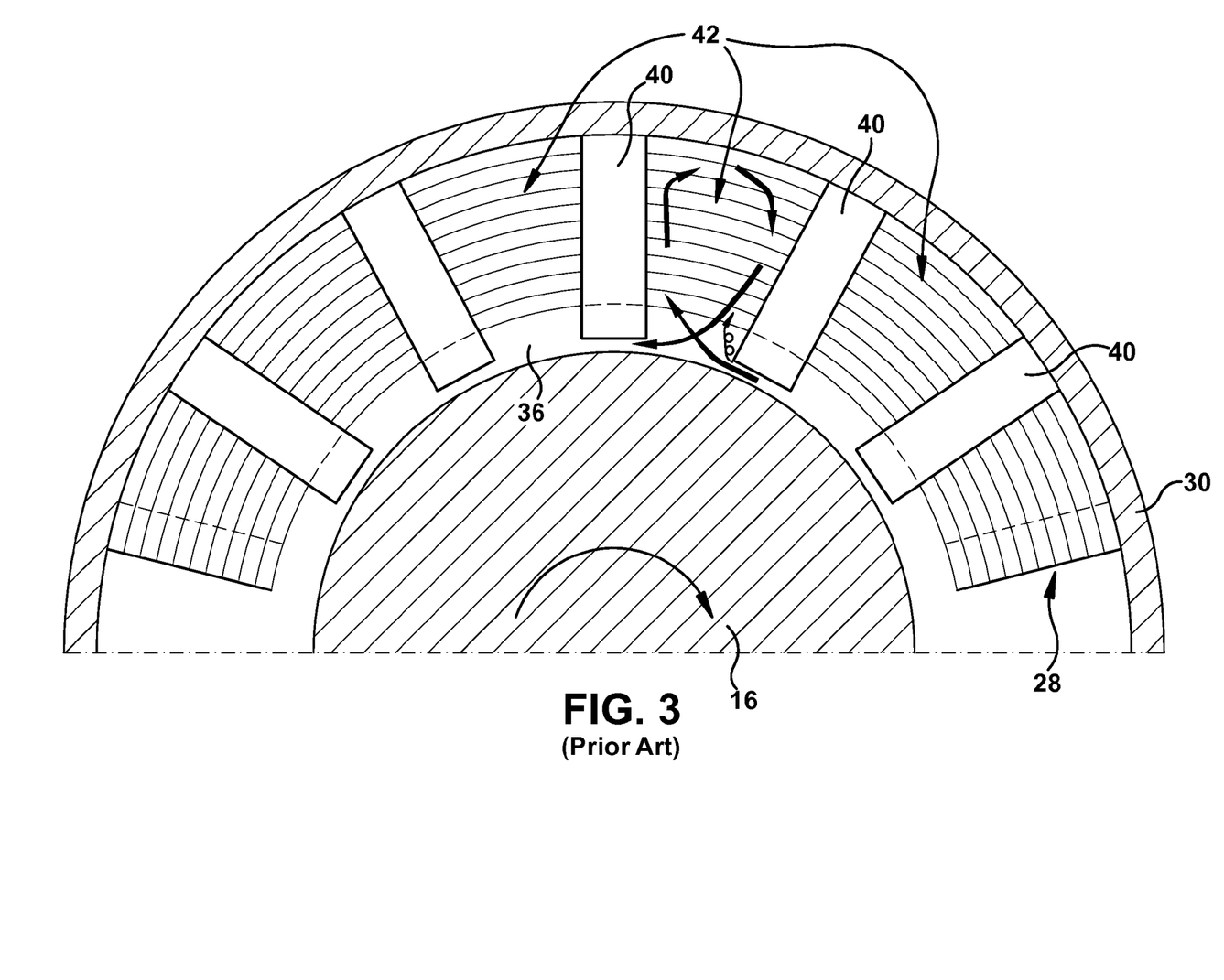
FIG. 3 is a schematic illustration showing conventional passive gas flow into and through endwinding cavities.

As shown best in FIG. 3, in most cases, a spaceblock 40 disposed between adjacent coils (whether axially extending coils 23 or end straps 27) defines first and second cavities 42, adjacent to spaceblock 40 and between mutually adjacent coils. The spaces between the concentric stacks of endwindings 28 (FIG. 3) are divided into cavities 42. These cavities are bounded on the top by retaining ring 30 and on four sides by adjacent end straps 27 and adjacent spaceblocks 48, as shown in FIG. 2. Similarly, as shown best in FIG. 2, spaceblocks 40 between radial stacks of axially extending coils 23 may be divided into cavities 54, 56. Typically, as shown for the outermost coils in FIG. 2, spaceblock 40 (body wedge blocks 52) disposed between adjacent coils 23 define only one cavity 54 adjacent thereto because the spaceblock is disposed directly against an end of a rotor tooth 29. Cavities 54 are bounded on the top by retaining ring 30 and on four sides by adjacent coils 23 and adjacent spaceblocks 40 (coil side block 50 and body wedge block 52). In accordance with embodiments of the invention, however, as shown for the innermost coils in FIG. 2, cavities 56 may also be present where spaceblock 40 (body wedge block 52) is not against an end of rotor tooth 29. Cavities 56 may be bounded on the top by retaining ring 30 (or wedges 26 (FIG. 1)) and on four sides by adjacent coils 23, adjacent spaceblocks 40 (coil space blocks 50) and an end of rotor tooth 29. FIG. 1 shows this latter situation.

As best seen in FIG. 1, each of the above-described cavities is in fluid communication with gas inlet passage 34 via annular region 36. A portion of the cooling gas entering annular region 36 between endwindings 28 and rotor spindle 16 through gas inlet passage 34 thus enters the cavities 42, 54, 56, circulates therein, and then returns to annular region 36 between the endwinding and the rotor spindle. Gas flow is shown by the arrows in FIGS. 1 and 3.

The inherent pumping action and rotational forces acting in a rotating generator cavity typically produce a large single flow circulation cell, as schematically shown in FIG. 3. This flow circulation cell exhibits its highest velocity near the peripheral edges of the cavity, leaving the center region inadequately cooled due to the inherently low velocity in the center region of the cavity. As can be seen from FIG. 3, large areas of the corner regions are also inadequately cooled because the circular motion of the flow cell does not carry cooling flow into the corners.

Referring now to FIGS. 4-5, there is illustrated a partial section of the rotor endwinding assembly showing some of the cavities 142 with the direction of rotation indicated by arrow X according to U.S. Pat. No. 6,465,917. At least one and preferably each spaceblock 140 is provided with a flow deflector structure 144 on the surface 146 thereof disposed on the downstream side of the respective cavity (hereinafter downstream surface) for redistributing coolant flow to the center of the respective cavity 142 to increase the heat transfer coefficient there. Each deflector structure 144 has a lower generally curved surface 148 for intercepting and redirecting flow as shown by arrow A. The upper surface 150 is generally planer so that the deflector defines a generally thin flow facing edge 152 so as to effectively intercept flow without unnecessary pressure loss.

In operation, rotor rotation in direction X will cause cooling gas to be drawn through gas inlet 34 (FIG. 1) into annular region 36 between end winding 28 and rotor spindle 16. A kinetic pressure head is present which drives the cooling gas toward the downstream side 146 of cavity 142 in a generally circular flow. At least a portion of the coolant flow is intercepted by deflector 144 and redirected as shown by arrow A to the central region of the cooling cavity 142, which would otherwise be generally starved of coolant flow. Coolant flow that is not intercepted by the deflector continues in its generally circulatory flow as shown by arrow B. The intercepted flow and the non-intercepted flow are rejoined on the upstream side of the cavity and continue in a clockwise direction, in the illustrated configuration, under the spaceblock 140 and into the next sequential cavity. A single flow deflector is provided that spans a substantial portion of the depth or axial dimension of the cavity, for example, at least about 75% and more preferably on the order of 100% of the depth of the cavity.

Turning now to FIG. 5, a partial section is shown of the rotor endwinding showing cavities 242 defined between spaceblocks 240 and with the direction with rotation indicated by arrow X according to U.S. Pat. No. 6,465,917. As illustrated, at least one deflector structure 244 is provided to deflect coolant flow to the central region of the adjacent cavity. As in the embodiment of FIG. 4, in the illustrated assembly, the defector structure(s) 244 are provided on the downstream surface 246 of at least one spaceblock 240. However, in this case, each deflector 244 extends only a part depth or part axially of the spaceblock so as to leave at least one vertical flow region for some high momentum circulating coolant flow to reach the outer radial corner of the cavity while the remainder of the coolant is deflected towards the center of the cavity.

A partial depth deflector may be disposed to span the part depth of the cavity from adjacent one endwinding wall of the cavity, adjacent the other endwinding wall of the cavity, or generally centrally of its associated spaceblock. In one case, single deflector 244 may be provided to span about one half of the depth of the associated spaceblock.

Thus, as illustrated, the coolant flow into the respective cavity 242 will flow to and begin its flow radially outwardly along the spaceblock surface 246. A portion of that flow is intercepted and deflected by the deflector structure(s) 244 toward the central region of the respective cavity as shown by arrow A. The remainder of the coolant flow bypasses the deflector structure because of the gaps defined by its truncated axial length and continues up and radially outwardly along the spaceblock, as shown by arrow C, for continuing as circulating flow, as shown by arrow B. The deflected flow and the non-deflected flow are rejoined at the upstream side of the cavity to continue in a clockwise direction, below and around the spaceblock 240 to the next sequential cavity 242.

Deflector 144, 244 may extend at least about 20% and more preferably at least about 25% of the circumferential dimension of the cooling cavity so as to effectively intercept and redirect the flow towards the central region of the cavity, rather than merely causing surface turbulence. The curved configuration of the lower surface 148, 248 of the deflector enhances the deflector function.

Referring now to FIGS. 6-15, according to embodiments of the invention, at least one and preferably each spaceblock 340 includes a shape configured to aid in intercepting and redirecting a circulating coolant flow within a cavity 342. Each of the FIGS. 6-15 work substantially similar to the above-described FIGS. 4 and 5 embodiments.

Figure 6:
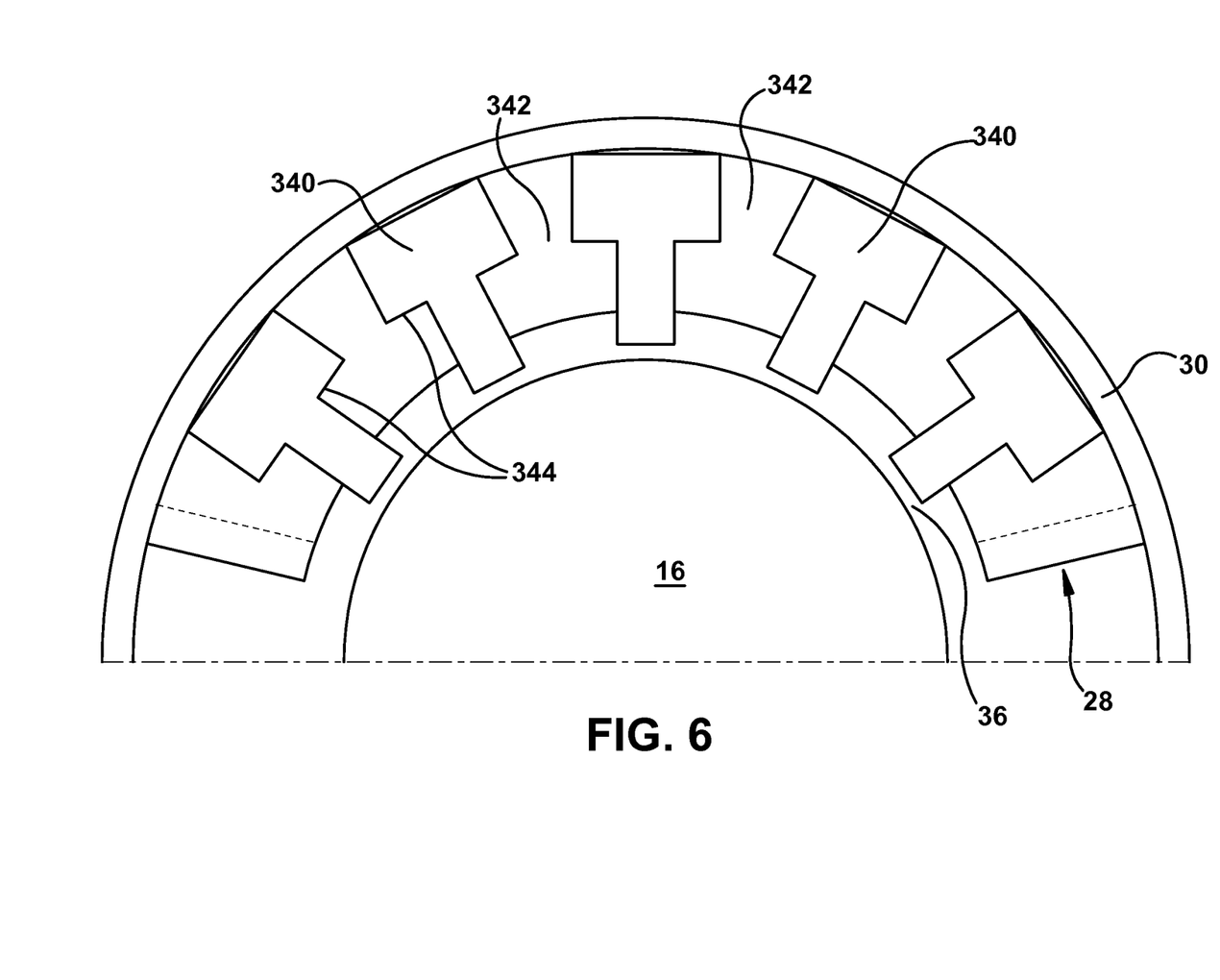
FIG. 6 is a schematic illustration showing an embodiment of a gas-cooled dynamoelectric machine including a spaceblock according to embodiments of the invention.

In FIG. 6, each spaceblock 340 has a substantially T-shaped cross-section, providing at least one flow deflector structure on at least one cavity facing surface 360 (FIG. 7 only for clarity) of the spaceblock for intercepting and redirecting circulating coolant flow in the cavity towards a central region of the at least one cavity. In this case, spaceblocks 340 are illustrated in a partial section of the rotor endwinding assembly in the setting of cavities 342, i.e., end straps 27. Similarly, spaceblock 340 according to any of the FIGS. 6-15 embodiments may be disposed within axially extending coils 23 as shown in FIG. 2. Thus, spaceblock 340 may be disposed within axially extending coils 23 and/or end straps 27, as shown best in FIGS. 1-2. Consequently, as used herein, "coil facing" may mean facing axially extending coils 23 or end straps 27, collectively coils 22 of endwindings 28.

FIGS. 7-15 show enlarged perspective views of different embodiments of spaceblock 340, and in particular, different cross-sectional shapes for spaceblock 340 resulting in differently shaped flow deflector structures 344. In each of the herein-described embodiments, except perhaps FIG. 14, flow deflector structure 344 extends from a radially extending surface 360 (FIG. 7 only for clarity) of spaceblock 340.

Figures 7, 8:
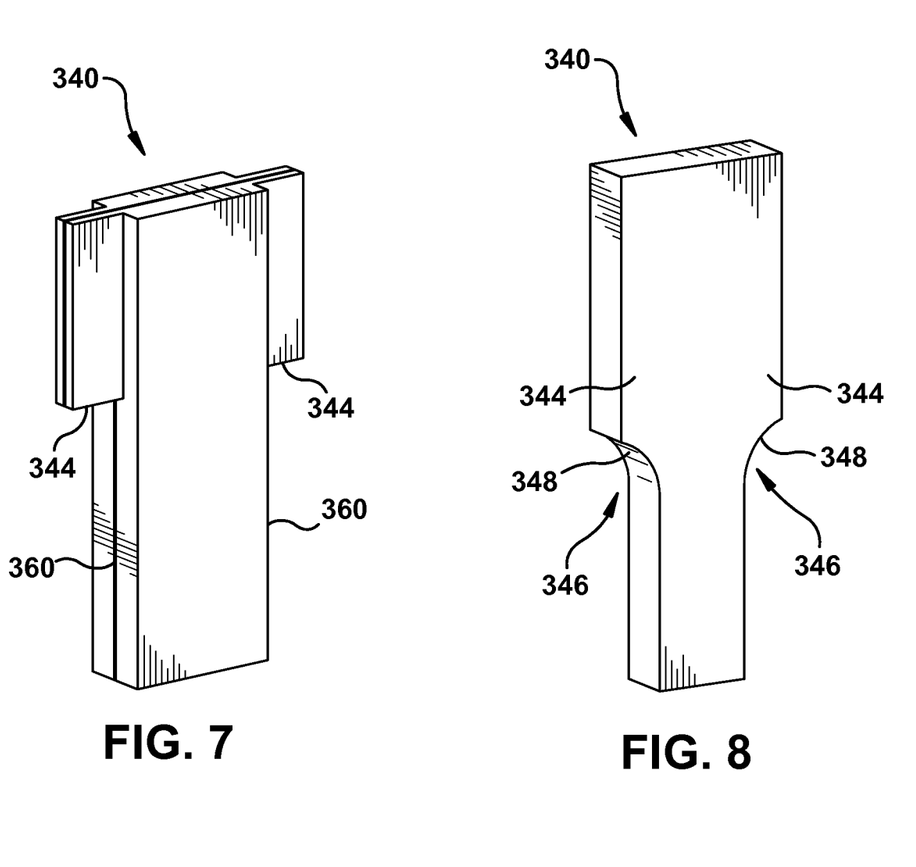
FIGS. 7-15 are enlarged perspective views of embodiments of a spaceblock according to the invention.

FIGS. 7 and 8 show embodiments (and FIG. 6) of spaceblock 340 including a substantially T-shaped cross-section that provide a flow deflector structure 344 to each of the pair of cavities 342 on either side of spaceblock 340 (FIG. 6). FIG. 7 shows an embodiment in which each flow deflector structure 344 spans only a portion of a depth of a respective cavity, i.e., it is not as thick as the rest of spaceblock 340, similar to the FIG. 5 embodiment. FIG. 8 shows an embodiment in which each elbow portion 346 of the substantially T-shaped cross-section includes a curved surface 348.

Figure 9:
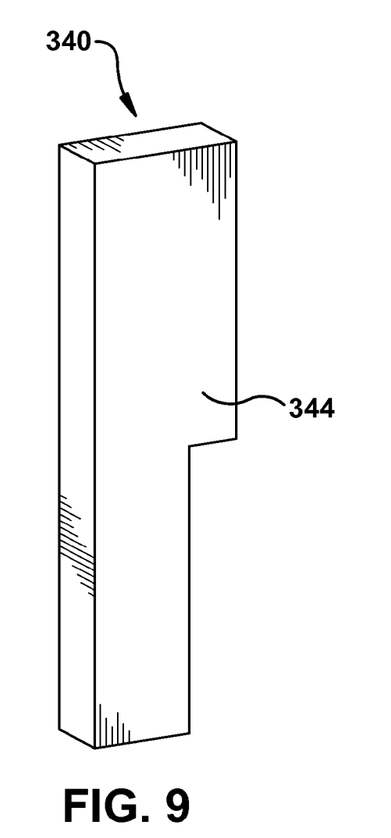
Figure 10:
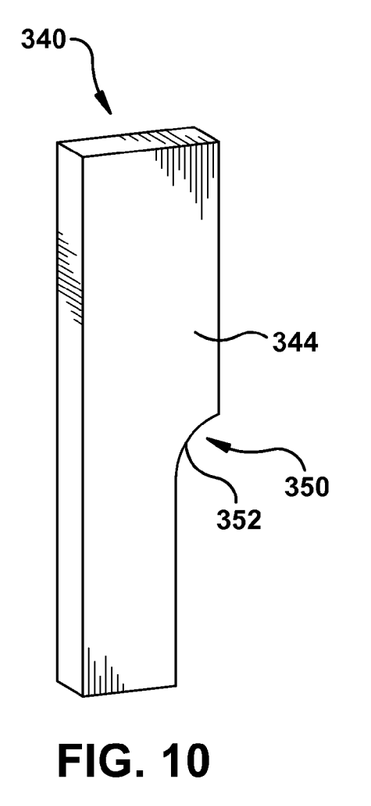

FIGS. 9 and 10 show embodiments of a spaceblock having a substantially L-shaped cross-section. In this case, only a single flow deflector structure 344 is provided. In FIG. 10, an elbow portion 350 of the substantially L-shaped cross-section includes a curved surface 352.

Figure 11:
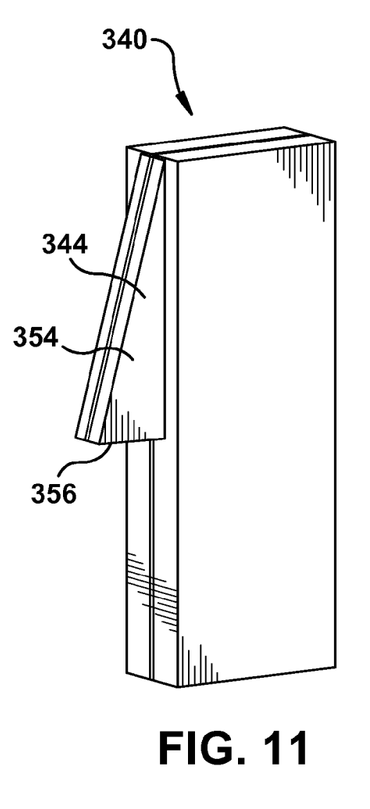
Figure 12:
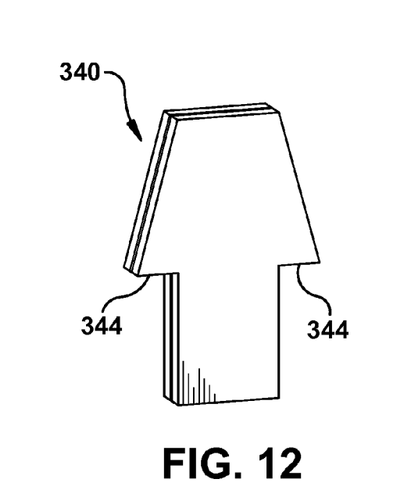
Figure 13:
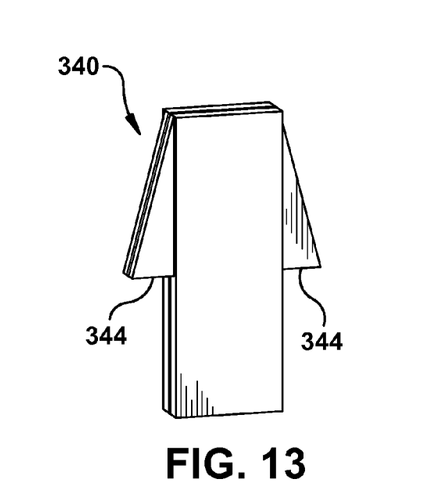

In FIG. 11, flow deflector structure 344 includes a substantially right angle triangular section 354 having a rotor facing ledge structure 356. In addition, as in other embodiments, flow deflector structure 344 may span only a portion of a depth of the at least one cavity. FIGS. 12 and 13 show embodiments in which spaceblock 340 has a substantially truncated arrow shaped cross-section. That is, spaceblock 340 has an arrow head cross section except a tip of the arrow has been eliminated. This structure provides a flow deflector structure for each adjacent cavity. In FIG. 12, as in other embodiments, the flow deflector structure may span only a portion of a depth of the at least one cavity.

Figure 14:
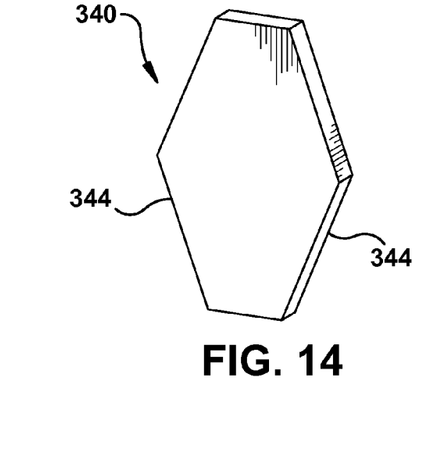
Figure 15:
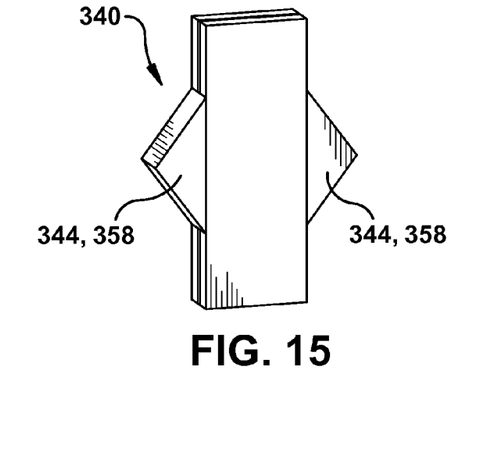

FIG. 14 shows an embodiment in which spaceblock 340 has a substantially hexagonally-shaped cross-section providing a flow deflector structure to each of the pair of adjacent cavities. FIG. 15 shows an embodiment in which each flow deflector structure 344 includes a substantially peaked edge structure 358, which would extend into each of the pair of adjacent cavities.

In any of the herein described embodiment, in which flow deflector structure 344 spans only a portion of the depth of the cavity(ies), it may extend about one half of a depth of the cavity. In other embodiments, flow deflector structure 344 spans a substantial portion of a depth of the at least one cavity.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dynamoelectric machine, comprising:
  a spaceblock disposed between adjacent coils to define at least one cavity adjacent the spaceblock and between mutually adjacent coils,
  the spaceblock including a flow deflector structure on a cavity facing surface of the spaceblock for intercepting and redirecting circulating coolant flow in the cavity towards a central region of the at least one cavity,
  wherein the flow deflector structure includes a substantially planar radially inner facing surface and a tapered surface facing radially outward that meet at a junction in the at least one cavity.

2. The dynamoelectric machine of claim 1, wherein the flow deflector structure includes a single flow deflector structure.

3. The dynamoelectric machine of claim 1, wherein the at least one cavity includes a pair of cavities, one on each of opposing sides of the spaceblock, and wherein the spaceblock includes substantially T-shaped cross-section, providing a flow deflector structure to each of the pair of cavities.

4. The dynamoelectric machine of claim 3, wherein each flow deflector structure spans only a portion of a depth of a respective cavity.

5. The dynamoelectric machine of claim 3, wherein each elbow portion of the substantially T-shaped cross-section includes a curved surface.

6. The dynamoelectric machine of claim 1, wherein the spaceblock has a substantially L-shaped cross-section.

7. The dynamoelectric machine of claim 6, wherein an elbow portion of the substantially L-shaped cross-section includes a curved surface.

8. The dynamoelectric machine of claim 1, wherein the flow deflector structure includes a substantially right angle triangular section having a rotor facing ledge structure.

9. The dynamoelectric machine of claim 8, wherein the flow deflector structure spans only a portion of a depth of the at least one cavity.

10. The dynamoelectric machine of claim 1, wherein the flow deflector structure extends from a radially extending surface of the spaceblock.

11. The dynamoelectric machine of claim 1, wherein the flow deflector structure spans a substantial portion of a depth of the at least one cavity.

12. The dynamoelectric machine of claim 1, wherein the flow deflector structure spans about one half of a depth of the at least one cavity.

13. A dynamoelectric machine, comprising:

a rotor having a plurality of adjacent coils;

a spaceblock disposed between adjacent coils to define at least one cavity adjacent the spaceblock and between mutually adjacent coils, the spaceblock including a flow deflector structure on a cavity facing surface of the spaceblock for intercepting and redirecting circulating coolant flow in the cavity towards a central region of the at least one cavity, wherein the flow deflector structure includes a substantially tapered radially outer facing surface and a substantially tapered radially inner facing surface that meet at a junction in the at least one cavity.

* * * * *